United States Patent [19]

Baum et al.

[11] 4,096,529

[45] Jun. 20, 1978

[54] CIRCUIT FOR DETECTING GHOSTS IN TV ANTENNA SYSTEMS

[75] Inventors: Robert E. Baum, Dell Rapids; Robert A. Winter, Sioux Falls, both of S. Dak.

[73] Assignee: Sencore, Inc., Sioux Falls, S. Dak.

[21] Appl. No.: 781,209

[22] Filed: Mar. 25, 1977

[51] Int. Cl.² .......................... H04N 5/21; H04N 7/02
[52] U.S. Cl. ..................................... 358/167; 358/139; 358/160; 358/905
[58] Field of Search ............... 358/139, 160, 167, 187, 358/905

[56] References Cited

U.S. PATENT DOCUMENTS 3,763,314  10/1973  Murakami ............................ 358/905

*Primary Examiner*—Richard Murray
*Attorney, Agent, or Firm*—Edmond T. Patnaude

[57] ABSTRACT

The presence of ghosts or other similar interference in a television signal is detected and indicated by comparing the peak voltage levels of the horizontal blanking pulses on opposite sides of the horizontal synchronizing pulses in the television signal.

5 Claims, 3 Drawing Figures

CIRCUIT FOR DETECTING GHOSTS IN TV ANTENNA SYSTEMS

The present invention is a new and improved method and instrument for indicating the presence of ghosts or reflection signals in a composite television signal.

BACKGROUND OF THE INVENTION

When installing a television receiving antenna, the common practice is to orient the antenna such that a field strength meter connected thereto has a maximum deflection or reading. However, such a meter may show a good acceptable signal level when, in fact, the signal is unacceptable because of the presence of interference signals therein. The most common interference signals encountered in television are caused by reflections of the television signal itself. If the reflective signal is of sufficient strength, it results in a second image displaced on the screen a short distance from the normal image. These displaced images have come to be known as ghosts and the reflected signals which cause them are known in the art as ghost signals or ghosts. While ghosts are most common in urban areas where tall buildings are commonplace, they may even occur in rural areas as a result, for example, of reflections from water towers. Ghosts are also caused by reflections on the lead-in cable or distribution cables in cable TV systems.

In order to facilitate the installation of television antennas it would be desirable to incorporate in a field strength meter a circuit for detecting ghosts or other interference signals in the received television signal and also to indicate the strength of such interference signals. The service technician could thus aim the antenna in the best possible direction without multiple trips between the antenna and the television receiver and without the need of an assistant.

SUMMARY OF THE INVENTION

Briefly, there is provided in accordance with the present invention a new and improved method and circuit which detects the presence of ghosts and other interference signals in a composite television signal by comparing the peak voltage levels on the front and back porches of the horizontal sync signals in the received composite television signal. If there is no interference present, these two voltage levels will be equal. If a ghost is present, these levels will differ by an amount proportional to the strength of the ghost or reflected signal. This detector may be incorporated in a field strength meter wherefor the service technician can orient a television receiving antenna in the optimum direction without departing from the location of the antenna and without the need for third party assistance.

GENERAL DESCRIPTION OF THE DRAWINGS

Further objects and advantages and a better understanding of the present invention can be had by reference to the following detailed description, wherein.

DETAILED DESCRIPTION OF THE INVENTION

Figure 1:
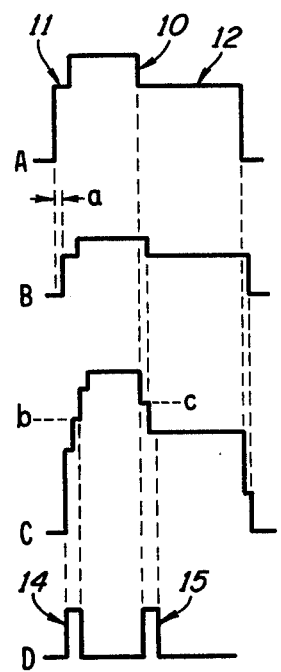
FIG. 1 is a schematic illustration of a plurality of wave forms which are useful in understanding the present invention.

Referring to FIG. 1, wave form A indicates a normal horizontal synchronizing signal incorporating the horizontal blanking pulse on which is superimposed a horizontal sync pulse 10. The portion of the blanking pulse which precedes the horizontal sync pulse 10 is known in the art as the front porch and is identified in FIG. 1 by reference numeral 11. Similarly, the portion of the horizontal blanking pulse which follows the horizontal sync pulse 10 is known in the art as the back porch and is identified by the reference number 12. In a clean signal as illustrated in FIG. 1 the front and back porches have constant and equal voltage levels.

If the composite television signal including the wave form A is reflected and the reflected signal also reaches an antenna which is receiving the wave form A, a similar but delayed composite television signal will be received. The horizontal sync signal portions of the reflected wave will be of essentially the same shape as the transmitted signal A but having traveled a greater distance, they will be delayed in time. Also, the amplitude of the reflected signal will generally be less than that of the direct wave A but this is not always the case. The time delay between the directly transmitted wave form A and the reflected wave form B is indicated in FIG. 1 by the reference character a.

Wave form C in FIG. 1 illustrates the wave form of the horizontal synchronizing portion of the voltage developed across the antenna by reception of the wave forms A and B. Wave form D indicates a pair of gate pulses 14 and 15. The pulse 14 occurs during the front porch portion 11 of the main television signal A and the pulse 15 occurs immediately following the horizontal sync pulse 10 and thus during the initial portion of the back porch portion 12. In accordance with the present invention, the peak voltage levels occurring in the composite television signal as received by the antenna during the occurrence of the pulses 14 and 15 are compared. If a ghost or reflected wave is present in the received signal, then these two peak voltages will be different from one another. It may be seen by inspection of wave form C that the peak voltage level occurring in the composite signal during the pulse 15 is greater than the peak voltage level occurring during the pulse 14, the latter peak voltage being indicated at b and the former peak voltage being indicated at c.

Figure 2:
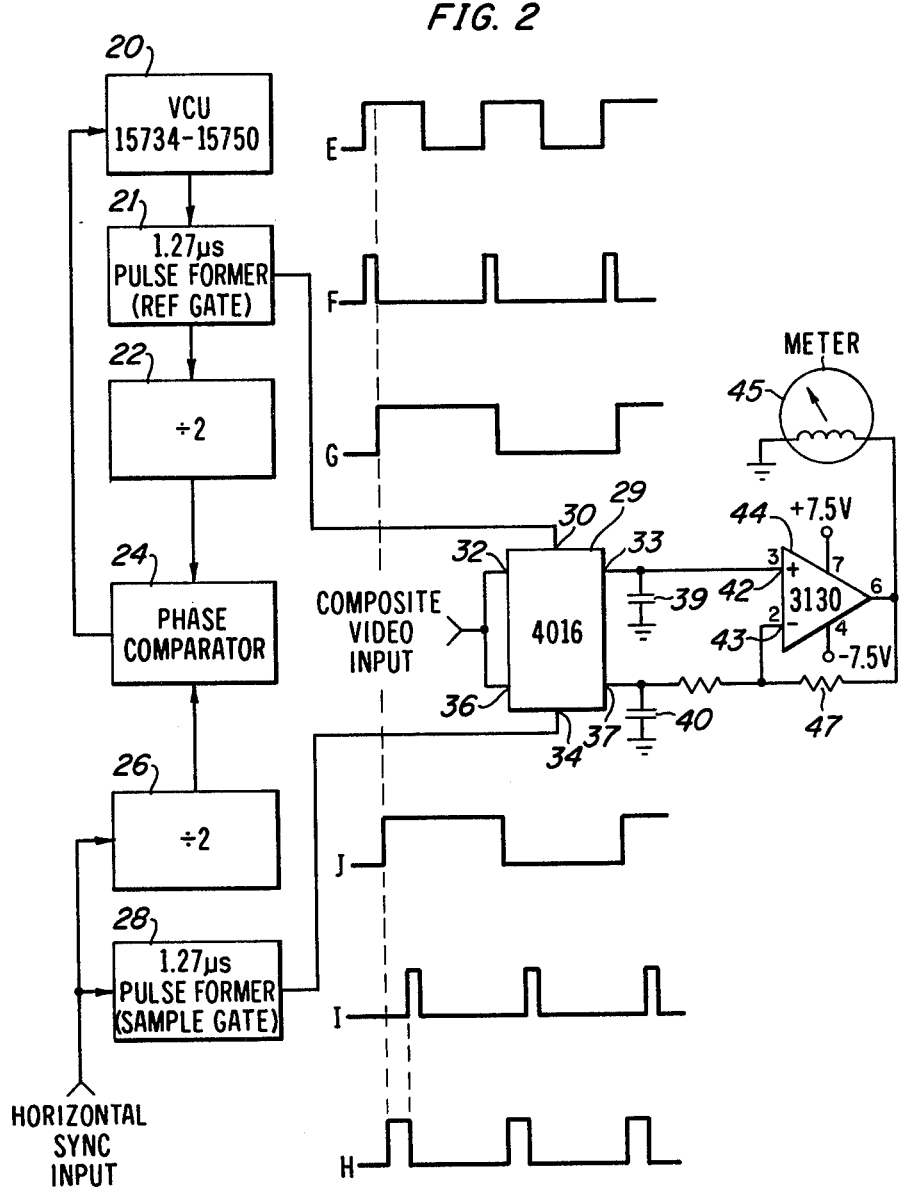
FIG. 2 is a schematic diagram of a preferred embodiment of one aspect of the present invention, namely, a circuit for detecting ghost and other interference signals in a composite television signal.

Referring to FIG. 2, there is shown in schematic form, a circuit for carrying out the above described method of detecting the presence of ghosts or reflected signals in a television signal. This circuit includes a voltage controlled oscillator 20 operating at frequencies in the range of about 15734 to 15750 Hertz. As is shown in the art the frequncy and phase of oscillation of a voltage controlled oscillator can be varied by varying the DC voltage applied thereto. As shown opposite the block 20, the output from the oscillator 20 is a square wave E. The square wave E is applied to a pulse former 21 which provides pulses having a duration of 1.27 microseconds after each positive going excursion of the wave E applied thereto. The output signal from the pulse former 21 is illustrated by the wave form F. A portion of the output signal from the pulse former 21 is applied to a flip-flop 22 which provides a square wave output signal as illustrated by the wave form G. The output signal from the flip-flop 22 is at one-half the frequency of the pulses in the wave form F and is delayed from the signal of wave form E by 1.27 microseconds. The output from the divider 22 is applied to one input of a phase comparator 24 whose output is coupled to the input of the oscillator 20 for control of the frequency and phase thereof.

The horizontal sync pulses are separated from the received composite signal and applied to the input of a divide-by-two flip-flop 26 and to a pulse former 28 which produces a pulse of 1.27 microseconds on the trailing or negative going edge of each horizontal sync input pulse. The horizontal pulses are indicated by the wave form H. The output from the pulse former 28 is indicated by the wave form I and the output of the flip-flop 26 is indicated by the wave form J. It may be seen by inspection that the wave forms G and J of the two signals applied to the phase comparator 24 are identical in phase, frequency and shape if the output of the oscillator 20 is in synchronism with the horizontal sync pulses. Should the signals illustrated in wave forms G and J be out of phase or of different frequency, the voltage developed at the output of the phase comparator 24 and applied to the oscillator 20 is such as to alter the frequency output of the oscillator so that it is equal to that of the received horizontal sync pulses.

It will be noted by inspection of wave forms F and I that the gate pulses are displaced by the width of the horizontal sync pulses. The pulse train outputs from the pulse formers 21 and 28 are applied to two of the gate inputs of a 4016 IC switch identified by the number 29. When the gate terminal 30 of the switch 29 is positive, the input terminal 32 is connected to the output terminal 33. Similarly, when the gate terminal 34 is positive, the input terminal 36 is connected to the output terminal 37. The composite video signal is applied simultaneously to the input terminals 32 and 36 of the multiple switch 29 wherefor the front porch of the horizontal sync signal appears at the output terminal 33 and the portion of the back porch immediately following each horizontal pulse appears at the switch output terminal 37. A pair of capacitors 39 and 40 are connected between the terminals 33 and 37 and ground and these two terminals are also coupled to a pair of input terminals 42 and 43 of an amplifier 44 whose output is connected to a zero reference meter 45 whose deflection needle indicates the strength of the ghost signal as well as the polarity of the interference provided thereby. A feedback resistor 47 is connected between the output and negative input of the amplifier 44 for controlling the gain thereof.

It may be seen that in the circuit of FIG. 2, the leading edge of each horizontal sync pulse is used to position the trailing edge of the gate pulse applied to the input terminal 30 of the switch 29. The trailing edge of each pulse is used to determine the location of the leading edge of each gate pulse applied to the switch input terminal 34. Accordingly, the switch 29 can never gate any portion of the horizontal sync pulses to the amplifier 44.

The ghost detector of the present invention may be incorporated into a conventional television field strength indicator or meter to enable the service technician to measure both the strength of the received signal as well as the strength of any ghosts which may be contained therein. With these two measurements being made simultaneously, it is a relatively easy operation to position the antenna to provide the optimum signal having the greatest field strength with an acceptable ghost component.

Figure 3:
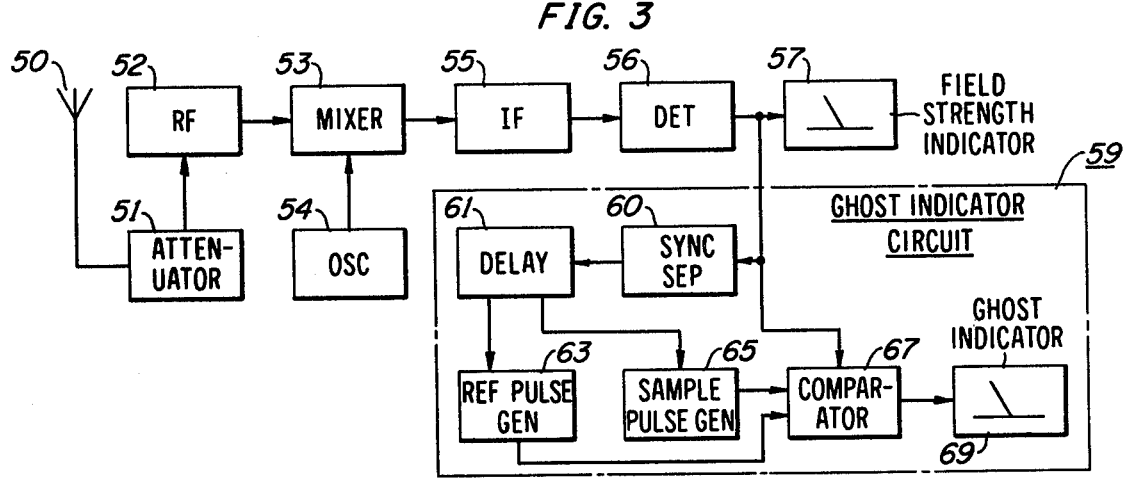
FIG. 3 is a schematic diagram of a field strength meter embodying the present invention.

Referring to FIG. 3 there is shown in schematic form a meter designed primarily for use in positioning television receiver antennas. This instrument provides an indication of the actual strength of the received television signal as well as the strength of any ghosts or reflected signal component contained therein.

As shown in FIG. 3, the signal from an antenna 50 is fed through an attenuator 51 to an amplifier 52 having its output coupled to a conventional mixer 53 which also receives the output of an oscillator 54. The IF output from the mixer 53 is amplified in an IF amplifier 55 and coupled to a video detector 56 whose output is coupled to a field strength indicating meter 57. As thus far described, the circuit is conventional.

In accordance with a feature of the present invention, the video output from the detector 56 is applied to a horizontal sync separator 60 which separates the horizontal synchronizing signals including the horizontal blanking pulses and the horizontal sync pulses from the remainder of the composite signal and supplies these pulses to a time delay circuit 61. The delay circuit is synchronzied by each horizontal sync pulse and produces a reference pulse 62.22 microseconds for black and white of 62.29 microseconds for color after the leading edge of each horizontal sync pulse. This output signal is applied to the reference pulse generator which thus produces a pulse during the front porch period of the succeeding horizontal synchronizing pulse. The delay circuit 61 further provides a second output after a delay of 0.08H after the trailing edge of the pulse from the reference pulse generator. These two pulses are applied to the gate inputs of a comparator 67 to which the composite video television signal from the detector 56 is applied. As in the circuit of FIG. 2, the output of the comparator is zero when the voltage levels of the front and the back porches are equal during the respective occurrences of the reference pulses from the generators 63 and 65. Therefore, the meter 69, which is driven by the output of the comparator 67, indicates zero when no ghost is present. On the other hand, if one or the other of the porches is greater than the other, then the meter 69 will provide an output whose value is indicative of the strength of the ghost component of the received signal.

In order to ensure that the gating pulses from the generators 63 and 65 do not overlap the horizontal sync pulses, the pulses must be spaced apart by at least 0.08H, H being the time of each horizontal line. Moreover, it is important that these pulses be in close proximity to the leading and trailing edges of the horizontal sync pulse to ensure that ghost signals from a nearby reflective surface are not missed. Preferably, therefore, the ghost detecting and indicating circuit of FIG. 2 is used as the ghost indicator circuit 59 in the instrument of FIG. 3. In that case, the output of the sync separator 60 is applied to the inputs of the flip-flop 26 and the pulse former 28 of FIG. 2.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A method of indicating the presence of a ghost in a television signal, comprising the steps of
   deriving a first signal having an amplitude proportional to a voltage level on the front porch of the horizontal sync portion of said television signal,
   deriving a second signal having an amplitude proportional to a voltage level on the back porch of the horizontal sync portion of said television signal,
   comparing said first and second signals, and
   providing an indication reponsive to the difference in the amplitude of said first and second signals.

2. A method according to claim 1 wherein
   said first and second signals are proportional to the peak voltage levels of said front and back porches, respectively.

3. An instrument for indicating the presence of ghosts in composite television signals including horizontal sync and blanking pulses, comprising
   means for providing first and second gating pulses at the frequency at which said horizontal sync pulses occur,
   said first gating pulses being synchronized to occur during the front porch portions only of said blanking pulses,
   said second gating pulses being synchronized to occur during the back porch portions only of said blanking pulses,
   comparator means for providing an output signal proportional to the difference between the amplitudes of two signals applied to two inputs thereto, and
   means responsive to said horizontal sync and blanking pulses and to said first and second gating pulses for applying portions of the front and back porch portions of said blanking pulses to said two imputs respectively,
   whereby the value of said output signal is indicative of the presence of ghosts in said television signal.

4. An instrument according to claim 3 wherein said means for providing said gating pulses comprises,
   means for separating said horizontal sync pulses from said composite television signals,
   means responsive to the trailing edges of said horizontal sync pulses for providing said second gating pulses, and
   oscillator means providing said first gating pulses.

5. An instrument according to claim 3 comprising
   readout means responsive to the output signal from said comparator means for providing a visual indication of said ghost.

* * * * *